United States Patent [19]

Oinoue et al.

[11] Patent Number: 4,563,705

[45] Date of Patent: Jan. 7, 1986

[54] AUTOMATIC FOCUS CONTROLLING APPARATUS AND METHOD

[75] Inventors: Kenichi Oinoue, Tokyo; Masahiro Aoki, Fussa; Masatoshi Ida, Hachioji; Junichi Nakamura, Hachioji; Asao Hayashi, Hachioji, all of Japan

[73] Assignee: Olympus Optical Co., Ltd., Tokyo, Japan

[21] Appl. No.: 444,155

[22] Filed: Nov. 24, 1982

[30] Foreign Application Priority Data

Nov. 27, 1981 [JP] Japan .................. 56-189242

[51] Int. Cl.⁴ .............................................. H04N 3/26
[52] U.S. Cl. .................................... 358/227; 358/212;
358/225; 354/400
[58] Field of Search .............. 358/213, 227, 209, 211, 358/241, 214, 212, 54, 225; 354/400, 402, 407, 354/408

[56] References Cited

U.S. PATENT DOCUMENTS

| | | | |
|---|---|---|---|
| 3,967,056 | 6/1976 | Yata et al. | 358/227 |
| 4,200,892 | 4/1980 | Weimer | 358/213 |
| 4,301,478 | 11/1981 | Sakane et al. | 358/227 |
| 4,320,417 | 3/1982 | Hanma et al. | 358/227 |
| 4,333,716 | 6/1982 | Sakane et al. | 354/25 |
| 4,383,274 | 5/1983 | Inuiya | 358/227 |
| 4,392,726 | 7/1983 | Kimura | 354/25 |
| 4,414,575 | 11/1983 | Yamamoto et al. | 358/227 |
| 4,415,924 | 11/1983 | Kawabata et al. | 358/50 |
| 4,422,097 | 12/1983 | Inuiya | 358/227 |
| 4,470,676 | 9/1984 | Kinoshita et al. | 354/406 |

FOREIGN PATENT DOCUMENTS

| | | | |
|---|---|---|---|
| 2241279 | 2/1974 | Fed. Rep. of Germany | 358/227 |
| 149575 | 11/1980 | Japan | 358/227 |

*Primary Examiner*—Gene Z. Rubinson
*Assistant Examiner*—Robert Lev
*Attorney, Agent, or Firm*—Parkhurst & Oliff

[57] ABSTRACT

In order to effect an automatic focus control in an image pick-up apparatus, a photography lens for forming an image of the object onto a two-dimensional solid state image sensing device is arranged in a fixed position, while the two-dimensional solid state image sensing device is arranged movably in the optical axis direction of the photography lens, and the image sensing device is moved in accordance with a focusing error signal detected by a focusing condition detecting circuit having an additional light receiving element mounted on the same substrate as the image sensor but discrete from and operating independently of the image sensor. Since the light and small solid state image sensing device is moved for the focus control instead of the heavy and large photography lens, it is possible to perform the focus control in a prompt manner and to make a mechanism for driving the image sensing device small and simple.

7 Claims, 8 Drawing Figures

FIG. 1
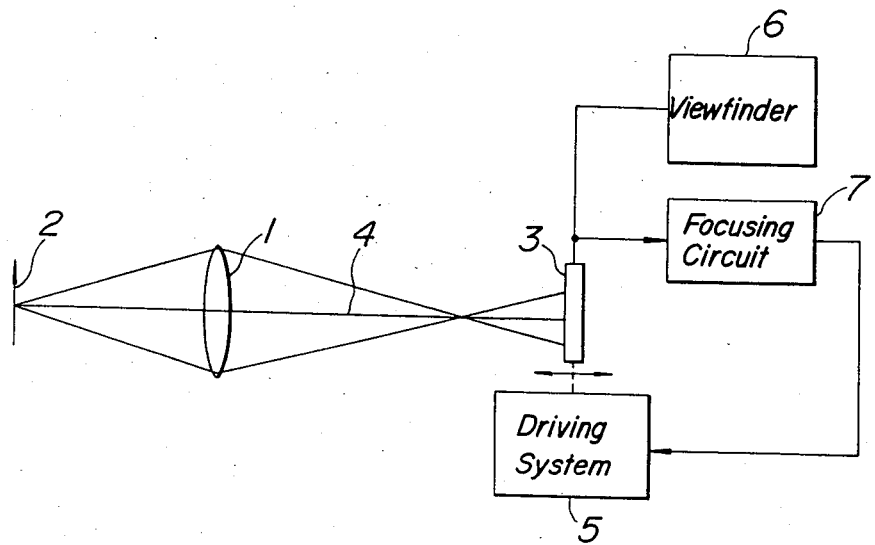
FIG. 2A
FIG. 2B
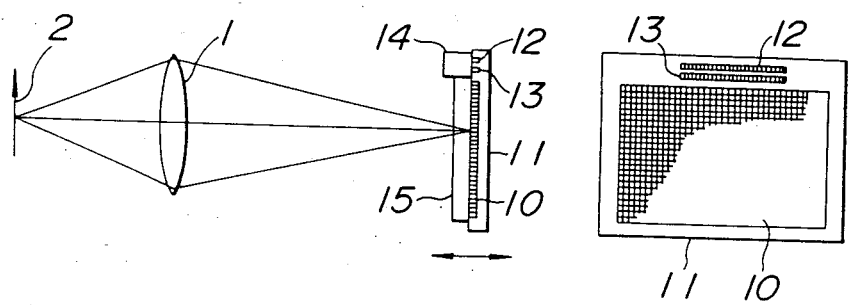

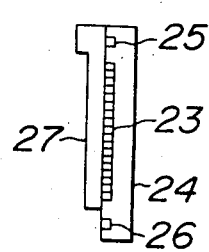
FIG_5
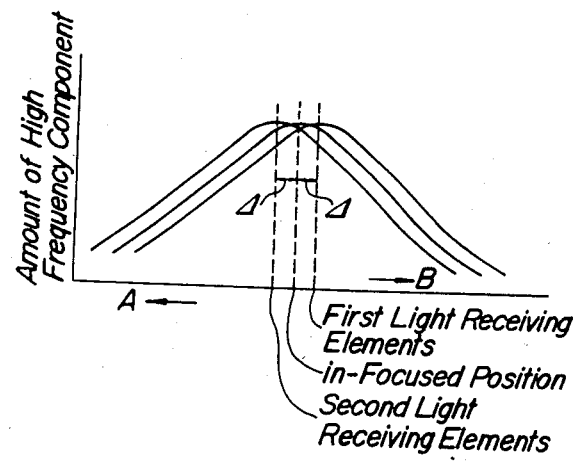
FIG_6
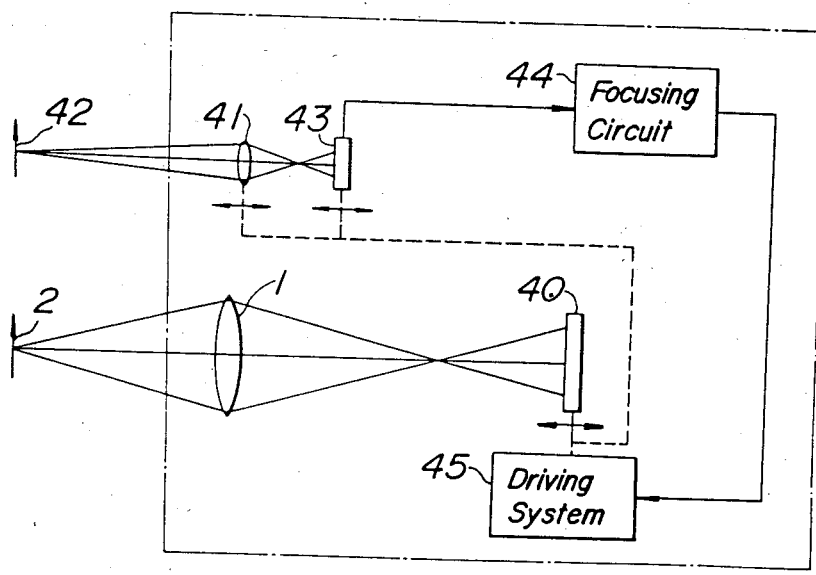
FIG_7

AUTOMATIC FOCUS CONTROLLING APPARATUS AND METHOD

BACKGROUND OF THE INVENTION

The present invention relates to an automatic focus controlling apparatus and method for use in an image pick-up apparatus comprising a two-dimensional solid state image sensing device upon which an image of an object is focused by an imaging lens.

Heretofore, there has been proposed automatic focus controlling apparatus and method for use in a television camera or a still camera, wherein an image of an object is automatically focused onto a light receiving surface of an image sensing device or a film surface by means of a photography lens. For example, in the television camera, a part of the light flux transmitted through the photography lens is detected by light receiving elements positioned at conjugate points with respect to a light receiving surface of an image pick-up tube so as to derive a focusing error signal in accordance with a defocused condition of a projected image. Then, the photography lens is moved in an optical axis direction by energizing a motor in relation to the focusing error signal, and thus the image can be always formed on the light receiving surface of the image pick-up tube in an in-focused condition. There has been also proposed a still camera in which the in-focused image can be formed on the film surface by driving the photography lens in accordance with the detected focusing error signal. However, in the known image pick-up apparatuses mentioned above, since the large and heavy photography lens must be moved in the optical axis direction by energizing the motor, a driving system becomes large and it is very difficult to move the photography lens at a high speed. In the television camera, since the photography lens becomes especially large in size and heavy in weight, it is not possible to perform the fast focus controlling operation.

Currently, according to a development in a semiconductor field, there has been developed a television camera using a two-dimensional solid state image sensing device such as CCD or BBD, and further proposed a still camera using such a solid state image sensing device.

SUMMARY OF THE INVENTION

The present invention has for its object to provide a focus controlling apparatus including a two-dimensional solid state image sensing device, in which an in-focused image of an object can be projected upon the solid state image sensing device in a prompt manner by means of an extremely simple and small driving system.

According to the invention, an automatic focus controlling apparatus for use in an image pick-up apparatus including a two-dimensional solid state image sensing device and a photography lens for projecting an image of an object to be picked-up upon the image sensing device, comprises means for detecting a focusing condition of the image projected upon the image sensing device to generate a focusing error signal; and means for moving said two-dimensional solid state image sensing device with respect to the stationary photography lens in the optical axis direction of said photography lens in response to said focusing error signal, whereby an automatic focus control is performed at a high speed.

The another object of the invention is to provide an automatic focus controlling method for use in the image pick-up apparatus.

According to the invention, a focus controlling method for use in an image pick-up apparatus including a two-dimensional solid state image sensing device onto which an image of an object to be picked-up is projected by a photography lens comprises the steps of arranging said photography lens in a fixed position; and moving said two-dimensional solid state image sensing device in an optical axis direction of said photography lens in accordance with defocused amount and direction.

The present invention is based on the recognition that the two-dimensional image sensing device is extremely small and light and therefore, it is very advantageous to move the two-dimensional solid state image sensing device instead of the photography lens.

BRIEF DESCRIPTION OF THE DRAWINGS

FIG. 1 is a schematic view showing one embodiment of the automatic focus controlling apparatus according to the invention;

FIGS. 2A to 5 are schematic views illustrating another embodiment of the automatic focus controlling apparatus according to the invention;

FIG. 6 is a graph showing a relation between the focusing condition and an amount of the high frequency component included in the output video signal; and FIG. 7 is a schematic view illustrating still another embodiment of the automatic focus controlling apparatus according to the invention.

DESCRIPTION OF THE PREFERRED EMBODIMENTS

Figure 3:
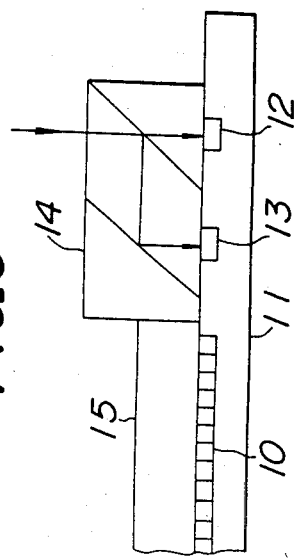

FIG. 1 is a schematic view showing one embodiment of the automatic focus controlling apparatus according to the invention. An image of an object 2 to be picked-up is projected onto a two-dimensional solid state image sensing device 3 by means of a photography lens 1. The solid state image sensing device 3 is arranged movably in an optical axis direction by means of a driving system 5. An output video signal derived from the solid state image sensing device 3 is suitably processed so as to display the image on an electronic viewfinder 6. In this embodiment, while the image displayed on the viewfinder 6 is observed, the solid state image sensing device 3 may be moved manually by the driving system 5 so as to display an in-focused image on the viewfinder 6. In this manner, it is possible to form the in-focused image of the object 2 on the solid state image sensing device 3. Further, in this embodiment, it is possible to perform an automatic focus controlling. To this end, a part of an output video signal of the solid state image sensing device 3 is supplied to a focusing condition detecting circuit 7 to generate a focusing error signal corresponding to a defocused amount, and this focusing error signal is further supplied to the driving system 5 so as to move automatically the solid state image sensing device 3 in an in-focused position. According to the invention, since the small and light solid state image sensing device 3 is moved, it is possible to use not only a usual small D.C. motor but also a voice coil or a linear motor as a driving source which can perform a fast operation for the driving system 5. For example, in an embodiment using the D.C. motor as a driving source, a rotation thereof corresponding to the defocusing amount is converted into a linear movement of the solid state image sensing device by a drive transferring means such as a rack and pinion mechanism and a lead screw and nut mechanism. Moreover, in the instance of using a voice coil or linear motor, the solid state image sensing device is directly moved by energizing the voice coil or the linear motor in one direction along the optical axis against a force of a coiled spring acting in the other direction. Therefore, the automatic focus controlling can be effected in an extremely high speed. Further, according to the invention, since an amount of movement of the solid state image sensing device 3 is substantially the same as that of the conventional automatic focusing mechanisms in which the photography lens 1 is moved to effect the focusing control, it is possible to utilize any one of the known mechanisms for driving the photography lens. Moreover, any one of the known focusing condition detecting circuits may be used as the circuit 7. This embodiment utilizes the fact that a high frequency component of the image becomes larger near the in-focused condition, and the output video signal of the solid state image sensing device 3 is supplied to a frequency-voltage converting circuit to generate the focusing error signal corresponding to the defocused amount, and then the focusing error signal is supplied to the driving system 5. In this case, the focusing error signal is made zero in the in-focused condition FIGS. 2 and 3 are schematic views showing another embodiment of the automatic focus controlling apparatus according to the invention. In this embodiment, light receiving elements for detecting the focusing condition are formed in one body with the solid state image sensing device, and thus the construction is further made much simpler. That is to say, as illustrated in FIG. 2A, the image of the object 2 is projected onto a two-dimensional solid state image sensing device 10 by the photography lens 1, and also, as shown in an elevation view of FIG. 2B, two linear arrays of light receiving elements 12, 13 for detecting the focusing condition are formed in a substrate 11 integrally with the two-dimensional solid state image sensing device 10. An optical path dividing prism 14 and an optical path correcting plate 15 are arranged on the light receiving element arrays 12, 13 and the image sensing device 10 in such a manner that these light receiving elements 12 and 13 are positioned equivalently front and rear with respect to a predetermined focal plane, respectively and the image sensing device 10 is positioned on the focal plane in the in-focused condition as shown in FIG. 3. The detection of the focusing condition is performed in such a manner that the output signals of the light receiving element arrays 12, 13 are processed in accordance with a given function to derive estimation values and then the focusing error signal having an amplitude and a polarity representing an amount and a direction of the detected deviation is calculated from the derived estimation values. The substrate 11 on which the two-dimensional solid state image sensing device 10 and the light receiving element arrays 12, 13 are formed in one body is moved in the optical axis direction in accordance with the focusing error signal thus obtained into the in-focused condition.

Figure 4:
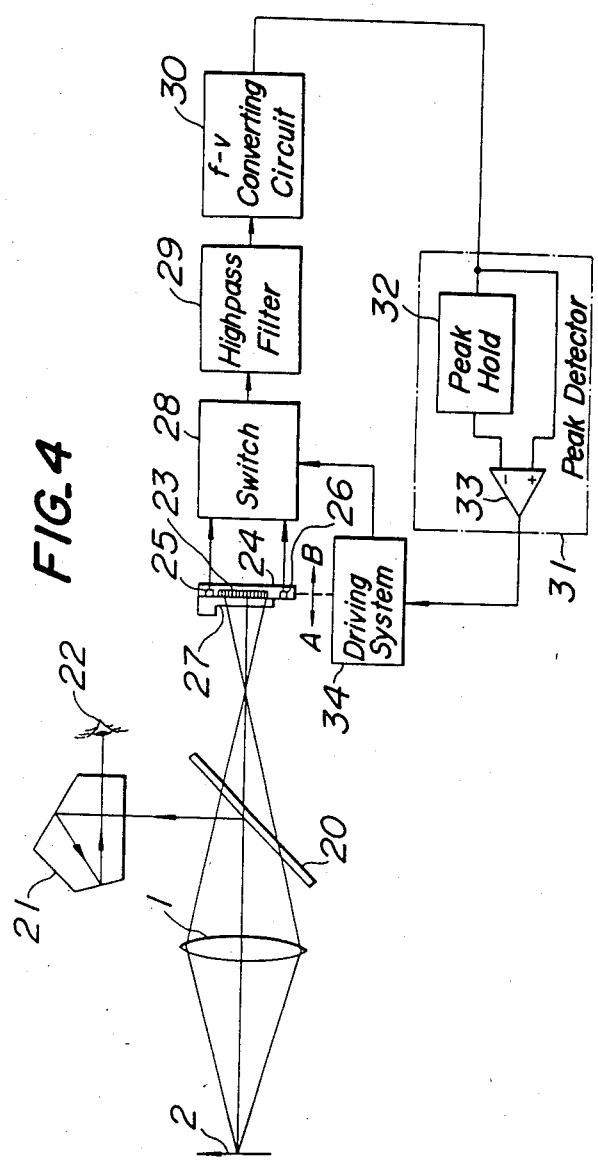

FIG. 4 is a schematic view showing another embodiment of the focus controlling apparatus according to the invention. In this embodiment, a part of the light flux from the object 2 transmitted through the photography lens 1 is reflected by a half mirror 20 so as to observe the image of the object 2 through a pentagonal prism 21 with the naked eye 22. In addition, the light flux transmitted through the half mirror 20 is projected onto a two-dimensional solid state image sensing device 23 and a pair of light receiving element arrays 25, 26 which are formed in the same substrate 24. As shown in FIG. 5, the light receiving element arrays 25, 26 are formed in one body in the substrate 24 of the solid state image sensing device 23, and an optical path correcting plate 27 is arranged on the substrate 24. The optical path correcting plate 27 is formed in such a manner that a thickness of the plate 27 on the first light receiving element array 25 is thicker than that on the solid state image sensing device 23 and no optical path correcting plate is existent on the second light receiving element array 26. In this embodiment, since use is made of the optical path correcting plate 27 mentioned above, the first and second light receiving element arrays 25 and 26 are positioned equivalently front and rear with respect to the focal plane, respectively, when the in-focused image is formed on the solid state image sensing device 23.

In the embodiment shown in FIG. 4, the output signals of the first and second light receiving element arrays 25, 26 are supplied to a frequency-voltage converting circuit 30 via a switch 28 which can switchover in response to a moving direction of the solid state image sensing device 23 and a highpass filter 29. FIG. 6 is a graph showing a relation between the focusing condition and an amount of the high frequency component included in the output video signal. In FIG. 6, the amount of the high frequency component takes a maximum value in the in-focused condition, and is decreased corresponding to the defocusing amount. Therefore, an output of the frequency-voltage converting circuit 30 is supplied to a peak detection circuit 31 so as to detect a peak value, and thus it is possible to detect the focusing condition. The peak detection circuit 31 comprises a peak hold circuit 32 and a comparator 33. The comparator 33 generates an in-focused signal at an instant when an output of the frequency-voltage converting circuit 30 begins to decrease after reaching the peak value. This in-focused signal is supplied to a driving system 34 for the two-dimensional solid state image sensing device 23 so as to stop the movement of the solid state image sensing device 23. In this case, the peak detection circuit 31 generates the in-focused signal a little later after the light receiving element array has entered into the in-focused position and the driving system 34 has a slight response delay. Therefore, if the light receiving element arrays 25, 26 are arranged on the same surface as that of the solid state image sensing device 23, the image sensing device 23 will be stopped at a position which has passed the focal plane and thus the in-focused condition could not be achieved. In order to remove the drawback mentioned above, the light receiving element arrays 25, 26 must be arranged in a front and a rear positions in the optical axis direction with respect to the solid state image sensing device, but in fact it is very difficult to manufacture such a device. Contrary to this, in the embodiment according to the invention, since it is possible to form the light receiving element arrays 25, 26 in the same substrate 24 as that of the image sensing device 23 by arranging the optical path correcting plate 27, the manufacture of the image pick-up apparatus can be made much simpler and easier as compared with the conventional one. In this embodiment, in the instance of moving the image sensing device 23 in an A direction, a signal for stopping the movement of the image sensing device is produced when the first light receiving element array 25 has detected the in-focused condition. Then the image sensing device is stopped after the response delay time of the driving mechanism. Therefore, when a deviation amount Δ in the optical axis direction between the light receiving element arrays 25 and 26 and the image sensing device 23 is determined by taking into account the response time lag, the image sensing device can be accurately stopped at the in-focussed position.

In the embodiments so far explained, the light receiving element arrays for the focus detection are arranged to receive the light flux transmitted through the photography lens. In an embodiment shown in FIG. 7, an image of an object 2 is projected onto a two-dimensional solid state image sensing device 40 through a photography lens 1, and there is further provided an optical system for the focus detection including a lens 41 and a light receiving element array 43 so as to project the image of the object 42 onto the light receiving element array 43 through the lens 41. An output signal from the light receiving element array 43 is processed in a focusing condition detecting circuit 44 to generate a focusing error signal corresponding to a defocused amount. Then, the focusing error signal is supplied to a driving system 45 so as to move simultaneously the image sensing device 40 in the optical axis direction of the photography lens 1 and the lens 41 and light receiving element array 43 in the optical axis direction of the focusing lens 41.

Even in this embodiment, the driving system 45 may be made simple and small, because the solid state image sensing device 40, lens 41 and light receiving element array 43 are small and light.

The present invention is not limited to the embodiments mentioned above, but various alternations and modifications are possible. For example, in the instance of performing automatic focus controlling, it is not always necessary to form the light receiving element arrays in one body with the two-dimensional solid state image sensing device. For instance, a half mirror is arranged between the photography lens and the solid state image sensing device and a light flux reflected by the half mirror may be made incident upon the light receiving element arrays arranged separately from the image sensing device. In this case the light receiving element arrays may be driven in the optical axis direction in conjunction with the two-dimensional solid state image sensing device. Moreover, the focus detection method used in the present invention is not limited to the method for detecting the high frequency component or the method for detecting the contrast, but use may be made of the known method for detecting a lateral shift of the image.

As mentioned above, in the focus controlling method and apparatus according to the invention, since use is made of the small and light two-dimensional solid state image sensing device, it is possible to make the construction of the driving system much simpler and smaller and to effect the focus controlling in a prompt manner. Especially, in the instance of performing the automatic focus controlling, the driving system can be made extremely small and thus the image sensing device can be made small in size and light in weight. Moreover, in case of arranging the light receiving element array for the focus detection in one body with the two-dimensional solid state image sensing device, it is possible to make the image pick-up apparatus much compact and simpler. In addition, it is not necessary to use any other driving system for moving the optical system for the focus detection.

What is claimed is:

1. An automatic focus controlling apparatus comprising:
    a two-dimensional solid state image sensing device formed on a substrate;
    an optical lens coupled in a fixed position with respect to said substrate and positioned to project an image of an object upon said image sensing device;
    means for detecting a focusing condition of the image projected on said image sensing device, including at least one light receiving element array formed on the same substrate with said two-dimensional solid state image sensing device such that a portion of the image of an object received from said lens is projected upon said light receiving element array to produce a focusing error signal, said at least one light receiving element array being discrete from and operating independently of said image sensing device; and
    means responsive to said focusing error signal for moving said substrate with respect to the said fixed optical lens along an optical axis of said lens in a direction to produce high speed automatic focus of an image on said image sensing device.

2. An automatic focusing controlling apparatus according to claim 1 wherein said at least one light receiving element array is two light receiving element arrays formed in said substrate in the same plane as that of the image sensing device.

3. An automatic focus controlling apparatus according to claim 2, wherein the apparatus further comprises an optical path dividing prism arranged on said light receiving element arrays in such a manner that said light receiving element arrays are positioned equivalently front and rear with respect to the image sensing device, respectively.

4. An automatic focus controlling apparatus according to claim 2, wherein the apparatus further comprises an optical path correcting plate arranged on said light receiving element array and the image sensing device in such a manner that a thickness of said optical path correcting plate on a first light receiving element array is thicker than that on said image sensing device and no optical path correcting plate is existent on the second light receiving element array.

5. An automatic focus controlling apparatus according to claim 4, wherein said focusing error signal generating means comprises a switch having inputs connected to the first and second light receiving arrays and an output which derives an output signal from either one of the first and second arrays in response to the moving direction of the image sensing device, a high-pass filter connected to the output of the switch to produce high frequency components from the output signal of the array, and a circuit for detecting a peak of the high frequency components to generate a stop signal for said means for driving the image sensing device.

6. An automatic focus controlling apparatus according to claim 5, wherein said stop signal generating circuit includes a frequency-voltage converting circuit for converting the high frequency components into a voltage signal and a peak detection circuit for detecting a peak of the voltage signal.

7. An automatic focus controlling apparatus according to claim 6, wherein said peak detection circuit includes a peak hold circuit and a comparator having a first input connected to an output of the peak hold circuit and a second input connected to an output of the frequency-voltage converting circuit.

* * * * *